Figure 6:
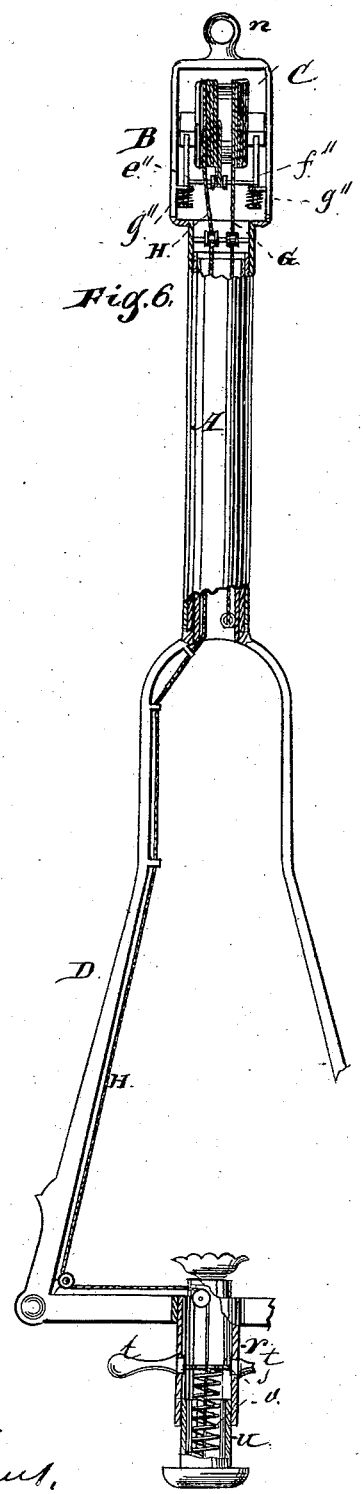

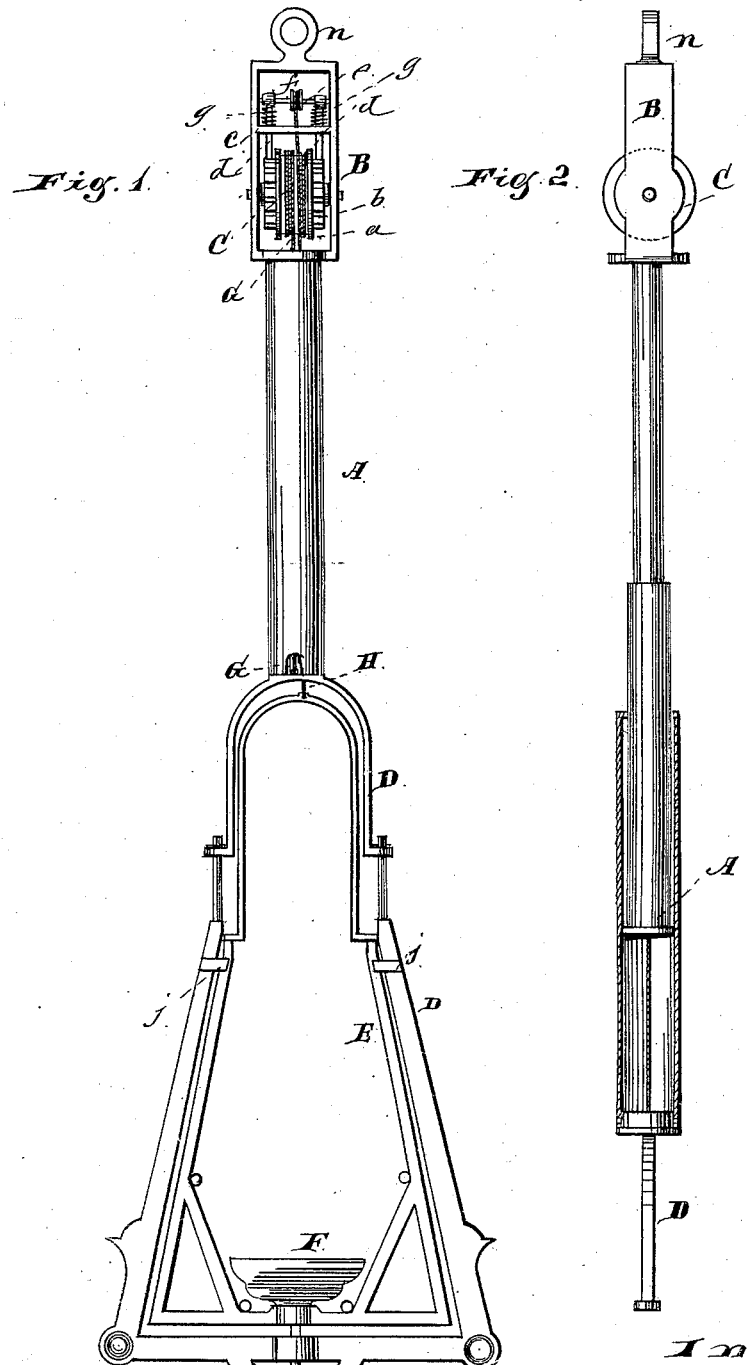

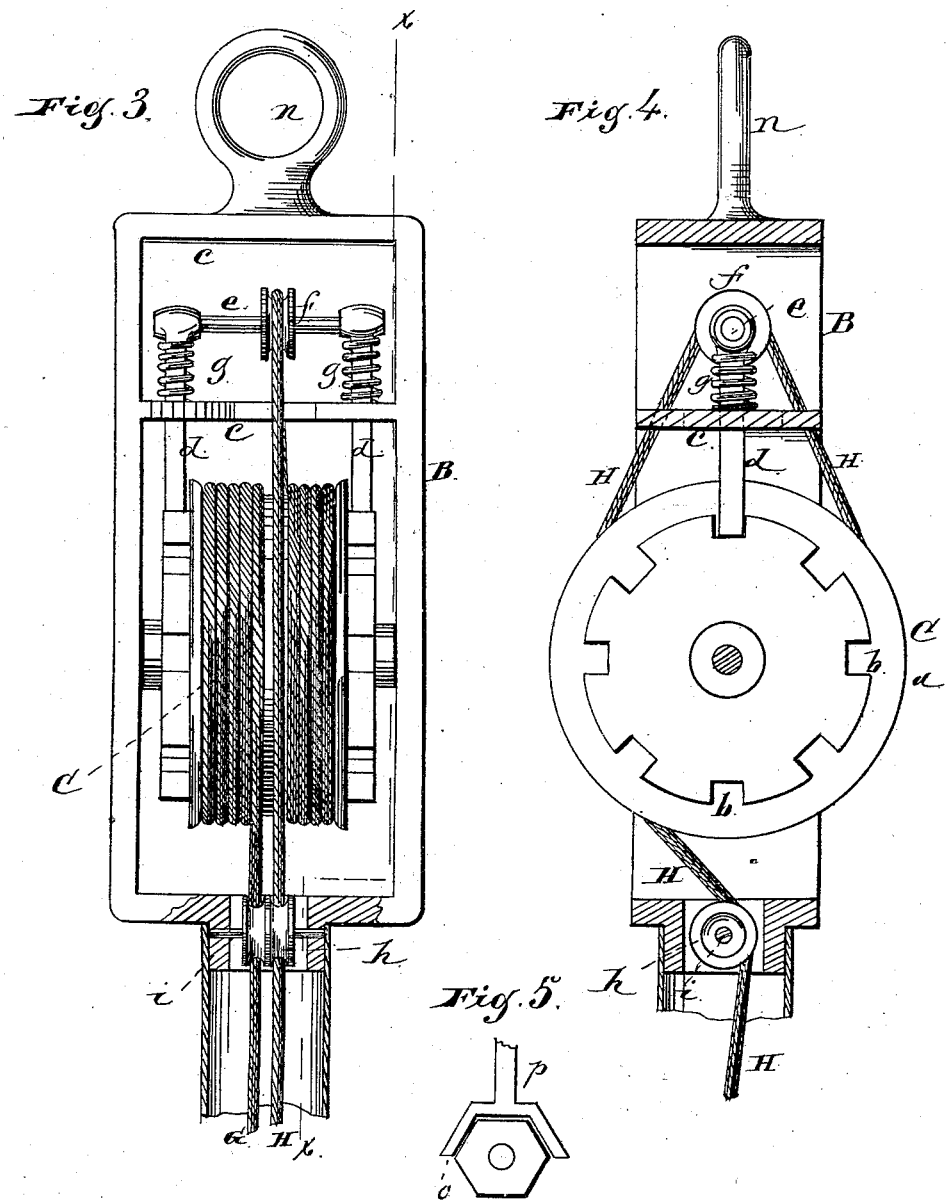

(No Model.)  
5 Sheets—Sheet 3.

G. & J. E. BOHNER.
EXTENSION LAMP.

No. 311,224.  Patented Jan. 27, 1885.

Witnesses:  
O. W. Bond  
Albert H. Adams

Inventors  
G. Bohner  
J. E. Bohner  
By Webb & Bond  
Attys.

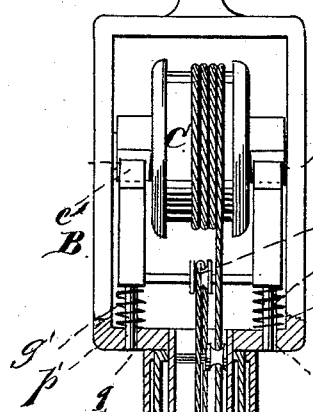
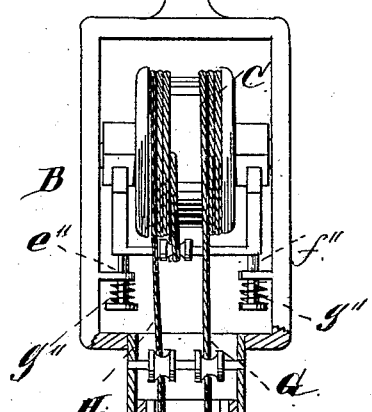
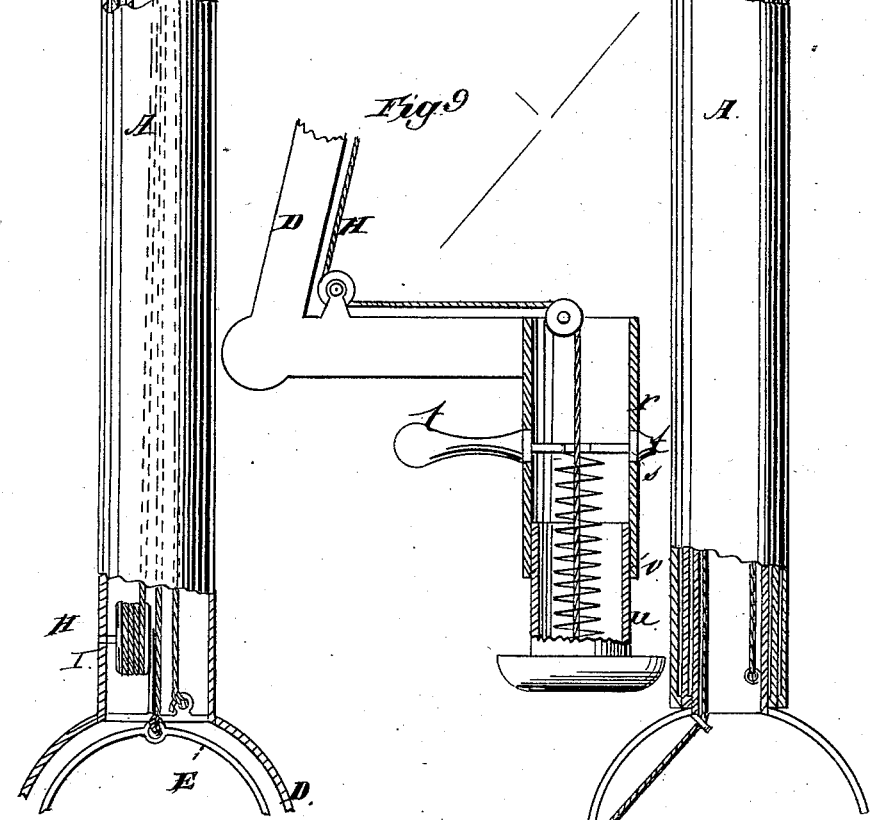

(No Model.)
G. & J. E. BOHNER.
EXTENSION LAMP.
No. 311,224. Patented Jan. 27, 1885.
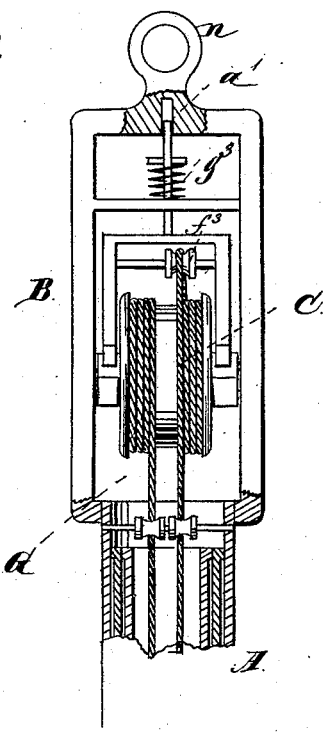
Fig. 10.
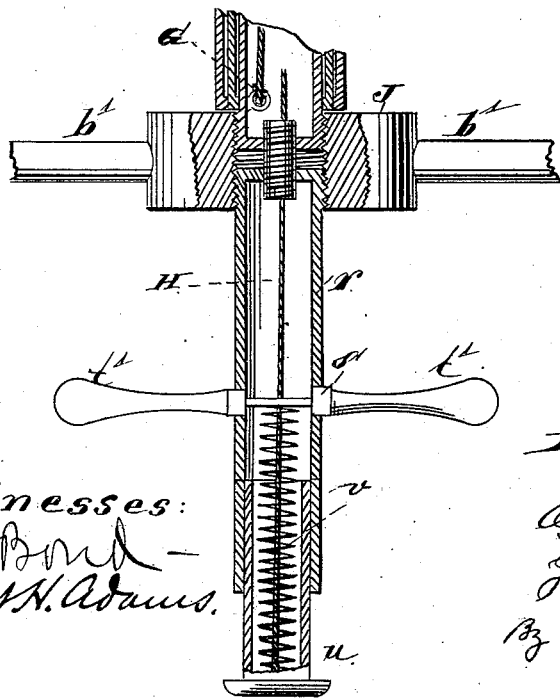
Witnesses:
Inventors.
G. Bohner
J. E. Bohner
By West & Bond
Attys

UNITED STATES PATENT OFFICE.

GEORGE BOHNER AND JOSEPH E. BOHNER, OF CHICAGO, ILLINOIS.

EXTENSION-LAMP.

SPECIFICATION forming part of Letters Patent No. 311,224, dated January 27, 1885.

Application filed March 4, 1884. (No model.)

*To all whom it may concern:*

Be it known that we, GEORGE BOHNER and JOSEPH E. BOHNER, residing at Chicago, in the county of Cook and State of Illinois, and citizens of the United States, have invented new and useful Improvements in Extension-Lamps, of which the following is a full description, reference being had to the accompanying drawings, in which—

Figure 1 is an elevation. Fig. 2 is a detail showing a tube partly extended. Fig. 3 is an enlarged detail. Fig. 4 is a section at line $x$ of Fig. 3. Fig. 5 is a modification of the locking device. Fig. 6 is a modification showing our improvement applied to a lamp having only one harp; Fig. 7, an enlarged view of a modification with the harps broken away; Fig. 8, an enlarged view of Fig. 7 with the harp broken away; Fig. 9, an enlarged detail view of the devices shown in Fig. 6 for operating the second cord, and Fig. 10 is an enlarged view of Fig. 8.

A patent was granted to us September 25, 1883, No. 285,381, for improvement in extension-lamps in which a winding-drum is shown located at the lower end of the extension-tube combined with the main harp and locking devices.

Our present invention relates to improvements in extension-lamps having a main winding-drum and devices to lock such drum located at the upper end of the extension-tube. In lamps of this class the distance between the locking devices and the lamp varies as the lamp is lowered and raised, and hence a rigid connection between the locking devices and the lamp proper cannot be used; and the object of our improvement is to provide means for operating the locking devices in such lamps from a point below the extension-tube, which we accomplish by means of a second cord or cable, one end being connected to a winding-drum and the other end to a weight or spring, such cable on its way from the drum to the weight or spring passing over or around a pulley connected with the locking device, substantially as illustrated in the accompanying drawings.

In the drawings, A represents an extension-tube. B is a frame at the upper end of such tube.

C is a winding-drum pivoted in the frame B, and provided with a spring, which is not shown; also, with flanges $a$ and notches $b$ in its edges, as usual.

$c$ is a cross-bar in the frame B.

$d$ are pins or detents arranged to engage and be disengaged from the notches $b$. These detents, as shown in Figs. 1, 3, and 4, pass through and move freely in the cross-bar $c$, and their upper ends are connected by a rod, $e$, on which a pulley, $f$, is located.

$g$ are springs arranged to lift the detents $d$ $d$ from engagement with the winding-drum.

$h$ is a pulley or guide-roller upon a shaft, $i$, which is supported in the lower end of the frame B.

D is a main harp, secured to the lower end of the extension-tube.

E is a second harp, located within the main harp D, and somewhat shorter than the main harp, so that it can have a little vertical motion independent of the other parts.

$j$ are guides to steady the harp E.

F is a socket which carries the lamp proper.

$k$ is a rod, the upper end of which is secured to the lower bar of the harp E. It passes loosely through the lower bar of the outer harp, D, and is provided with a knob, $l$, at its lower end.

$m$ is a finger-loop secured to the lower bar of the harp D, through which loop the rod $k$ passes loosely.

G is a main winding-cord. Its lower end is secured to the main harp D, or to some other suitable part, at or near the lower end of the extension-tube, and the other end, as shown in Figs. 1, 3, and 4, is secured to the winding-drum C, as usual.

H is a second cord, one end of which is connected with the inner harp, E. This cord, as shown in Figs. 1, 3, and 4, is carried up over the pulley $f$, then down to the drum C, to which it is secured. This cord H has been introduced into the lamp by us, and in connection with some other parts produces a new result. Both cords G and H, as shown in Figs. 1, 3, and 4, pass over the pulley $h$, which keeps them in the center of the tube, and the cord H, on its way to the pulley $f$, passes over the periphery of the drum C.

$n$ is an eye at the top of the frame B, by which the lamp can be hung upon a hook in the ceiling.

Fig. 5 represents one modification of the locking devices, in which, instead of notches $b$ and detents $d$, each end of the drum is many-sided, and forks $o$ engage with the same. The forks have stems $p$ and are operated in the same manner as the detents $d$.

It is not necessary to locate the locking devices above a main drum, and, instead of connecting one end of the second cord, H, with the main winding-drum C, a second drum may be provided, located either at the top of the extension-tube or at the lower end thereof. In Fig. 7 we have shown one form of such a modification, in which one end of the cord H is secured to the inner harp, E, while the other end is secured to an independent winding-drum, I, located, as shown, just above the main harp D. The cord, on its way from the harp E to the drum I, passes over the pulley $f'$ upon a rod, $e'$, which connects the stems $p'$ of the locking devices, which in this case are forks $o'$, and are located below the main drum C, and are held in engagement with the drum by the springs $g'$. The stems $p'$, as shown, pass through bearings $q$ in the frame B.

In Figs. 6, 8, and 9 we have shown another modification, in which the locking devices are located below the main winding-drum C, and a spring is used in connection with the lower end of the second cord, H, instead of a weight, and the inner harp, E, is omitted. The main harp D in this case has a downward hollow extension, $r$, from its lower bar. In this extension there is a shoulder, $s$, and to the extension are secured handles $t$.

$u$ is a short tube having a knob at its lower end, and fitting into the extension $r$.

$v$ is a strong spring located between the shoulder $s$ and the lower end of the tube $u$. The upper end of the cord H in this case is secured to the drum C, then passes around the pulley $f''$, then over the winding-drum, then down to the lower end of the tube $u$, where it is secured. As shown in Figs. 6 and 9, this cord H passes down on the inside of the harp D, under suitable guides, and through the lower bar of the harp. The pulley $f''$ is upon the rod $e''$, which is connected with the locking devices, which move in one or more suitable bearings. The springs $g''$ release the forks from engagement with the drum C at the proper time.

Thus far our improvement has been shown and described in connection with one or more harps with a single lamp located directly under the extension-tube; but it is clearly applicable to a chandelier-lamp, as shown in Fig. 10, in which the locking devices are located above the main winding-drum, to which both cords are connected at their upper ends. In this figure the locking devices are forks connected by a cross-bar at their upper ends, with a single stem, $a'$, passing through a bearing in the upper end of the frame.

$g^3$ is a spring arranged to disengage the forks from the drum.

J is a hub in which the lower end of the extension-tube is secured, and to which the arms $b'$, which carry the lamps, are also secured. The parts below the hub J are similar to those below the bar of the harp in Figs. 6, 8, and 9, $r'$ being a tube connected with the hub J, and provided with a shoulder, $s'$, upon the inside.

$t'$ are handles.

$u'$ is a tube having a knob at its lower end and fitting into $r'$.

$v'$ is a spring located between the shoulder $s'$ and the lower end of $u'$. In this case the lower end of the cord G is secured to the hub J. The lower end of the cord H is secured to the lower end of the tube $u'$, and passes up over the pulley $f^3$, and then down to the drum C, to which it is secured, the pulley $f^3$ being on the rod $e^3$, which is connected with the locking devices.

The operation is as follows: The weight of the inner harp, E, as shown in Fig. 1 of drawings, is such that when free to act it will overcome the resistance of the springs $g$ and hold the pins $d$ down in engagement with the notches $b$ in the winding-drum, the weight of the inner harp acting upon the pins $d$ through the cord H, which passes from the harp E to and over the pulley $f$, and then to the winding-drum. Suppose the parts to be in the position shown in Fig. 1, the operator can pass his fingers through the finger-loop $m$, the knob $l$ being in the palm of his hand. He can then push the harp E up a little, relieving the pins $d$ from its weight, when, by the action of the spring $g$, they will be lifted up from the notches in the winding-drum. Then, by pulling down with his fingers, both harps can be drawn down. When the lamp has been brought to the desired position, if the operator releases the knob, the inner harp, E, will descend by gravity, bringing the locking devices into engagement with the winding-drum. The lamp can be restored to its former position by lifting the harp E a little, as before, thus allowing the locking devices to be disengaged from the winding-drum, and then the action of the spring of the winding-drum will carry the harps and lamp up, and the slack of the cord H will at all times be taken up by the rotation of the drum.

It is evident that when the distance between the winding-drum C and the lamp varies there cannot be a rigid connection between the locking devices and the point below the lamp where such devices are controlled.

We have devised a flexible connection between the locking devices and the point of control, and means for taking up the slack, which is the important feature of our invention.

In Fig. 6 the springs $g'$ are arranged to hold the locking devices in engagement with the drum C, and they must overcome the weight of the harp E. By pulling down this harp E the springs $g'$ will be compressed and the locking devices will be disengaged from the drum. In this case the slack of the cord H is taken up by the drum I.

As shown in Fig. 7, the spring $v$, through the cord H, which passes under the pulley $f''$, holds the locking devices in engagement with the drum, the spring $v$ being strong enough to overcome the action of the springs $g''$. By compressing this spring $v$ the locking devices will be relieved from its effect, and the springs $g''$ will then disengage the locking devices from the drum.

As shown in Fig. 8, the locking devices and pulley $f^3$ are above the drum, and the spring $v'$ holds the locking device in engagement with the drum; but by compressing the spring $v'$ the locking device will be relieved from its action, and the spring $g^3$ will lift the locking device away from the drum.

What we claim as new, and desire to secure by Letters Patent, is as follows:

1. The combination, in an extension-lamp, of the extension-tube, a main winding-drum, arranged at the upper end of the extension-tube, a cord for the said drum, a locking device for holding and releasing the drum, and a second winding-cord acting on the locking device, substantially as described.

2. In an extension-lamp, the combination of an extension-tube, a main winding-drum, and devices for locking the same, both located at the upper end of the tube, a main winding-cord for raising and lowering the lamp, and a second winding-cord connected at one end with a winding-drum, and at the other end with a movable part operated from below the lower end of the extension-tube, and arranged to act upon the locking device, substantially as specified.

3. In an extension-lamp, the combination of an extension-tube, a main winding-drum and device for locking the same, both located at the upper end of the extension-tube, a pulley connected with the locking device, a main winding-cord for raising and lowering the lamp, and a second winding-cord having one end connected with a winding-drum and passing over the pulley, then down through the extension-tube to a movable part operated from below the extension-tube, substantially as and for the purpose specified.

GEORGE BOHNER.
JOSEPH E. BOHNER.

Witnesses:
E. A. WEST,
B. A. PRICE.